3,209,030
REDUCTIVE ALKYLATION OF AMINES

Edward J. Bicek, La Grange, Ill., assignor to Universal Oil Products Company, Des Plaines, Ill., a corporation of Delaware
No Drawing. Filed July 9, 1962, Ser. No. 208,590
7 Claims. (Cl. 260—574)

This invention relates to an improvement in the reductive alkylation process and, more particularly, to the use of a novel catalyst in the reductive alkylation of an organic compound having an amino or nitro substituent.

The use of a platinum catalyst, either in the form of the free metal or in the oxide form, has been proposed heretofore for use in the reductive alkylation process. However, it has been found that the platinum catalyst in the form of the free metal or in the oxide form is not sufficiently selective in its activity to be suitable for commercial use. In other words, the catalyst produces excessive quantities of undesired side reaction products. This means that the reactants charged to the process are consumed in forming the undesired products and are not available for conversion into the desired reductive alkylation product. In order to improve the platinum catalyst for this reaction, it heretofore has been proposed to reduce the catalyst with hydrogen or hydrocarbon and this has proved to considerably reduce the formation of undesired side reaction products. It now has been found that even further improvements can be obtained when the platinum catalyst is subjected to a sulfiding treatment prior to use.

In one embodiment the present invention relates to an improvement in the reductive alkylation of a reductively alkylatable compound having a substituent selected from the group consisting of amino and nitro groups with a carbonyl compound selected from the group consisting of ketones and aldehydes, which comprises effecting said reductive alkylation with hydrogen in the presence of a sulfided platinum catalyst.

Products formed by the reductive alkylation of an organic compound having an amino and/or nitro substituent with ketones or aldehydes in the presence of hydrogen are desirable for various uses. For example, the reductive alkylation of p-nitroaniline or p-phenylenediamine with a ketone produces an N,N'-di-sec-alkyl-p-phenylenediamine which is an effective inhibitor to prevent oxidative deterioration of unstable organic compounds and particularly gasoline, as well as being an effective antiozonant to prevent cracking of rubber. Similarly, the reductive alkylation of p-nitrophenol or p-aminophenol with a ketone produces N-sec-alkyl-p-aminophenol which also is a useful inhibitor. The reductive alkylation product of these and other organic compounds containing nitro and/or amino substituents also finds utility as dyes, intermediates in the preparation of pharmaceuticals.

The present invention is particularly applicable to the reductive alkylation of aromatic compounds containing one or more amino and/or nitro groups. Typical aromatic compounds which may be reacted in accordance with the present invention include nitrobenzene, dinitrobenzene, trinitrobenzene, aniline, diaminobenzene, triaminobenzene, aminonitrobenzene, diaminonitrobenzene, aminodinitrobenzene, aminodiphenylamine, diaminodiphenylamine, triaminodiphenylamine, tetraaminodiphenylamine, aminodiphenylsulfide, diaminodiphenylsulfide, triaminodiphenylsulfide, tetraaminodiphenylsulfide, aminodiphenylether, diaminodiphenylether, triaminodiphenylether, tetraaminodiphenylether, similarly substituted naphthalenes, anthracenes, aromatic compounds containing one of more hydroxy groups in addition to amino and/or nitro groups, such as nitrophenol, aminophenol, nitroaminophenol. It is understood that the aromatic compound may contain other substituents and particularly hydrocarbon groups attached to the ring. Preferred aromatic compounds for conversion in the present invention comprises p-nitroaniline, p-phenylenediamine, p-nitrophenol and p-aminophenol.

While the present invention is particularly applicable to the reductive alkylation of aromatic compounds containing nitro and/or amino substituents, it is understood that the invention may be used for the reductive alkylation of other nitro and/or amino compounds including ammonia, alphatic amines, alkanol amines. The aliphatic amines may contain one or more amino groups and include compounds as methyl amine, ethyl amine, propyl amine, butyl amine, amyl amine, hexyl amine, heptyl amine, octyl amine, ethylene diamine, propylene diamine, butylene diamine, pentylene diamine, diethylene triamine, dipropylene triamine, triethylene tetramine, tripropylene tetramine, tetraethylene pentamine, tetrapropylene pentamine, alkanol amines including ethanol amine, propanol amine, butanol amine, pentanol amine, hexanol amine, heptanol amine, octanol amine, diethanol amine, dipropanol amine.

Any suitable ketone and/or aldehyde is utilized. Ketones are particularly preferred when it is desired to form the N,N'-di-sec-alkyl and N-sec-alkyl substituted products. Suitable ketones include acetone, methyl ethyl ketone, methyl propyl ketone, methyl butyl ketone, methyl amyl ketone, methyl hexyl ketone, methyl heptyl ketone, methyl octyl ketone, diethyl ketone, ethyl propyl ketone, ethyl butyl ketone, ethyl amyl ketone, ethyl hexyl ketone, ethyl heptyl ketone, dipropyl ketone, propyl butyl ketone, propyl amyl ketone, propyl hexyl ketone, dibutyl ketone, butyl amyl ketone, butyl hexyl ketone. Other suitable but not necessarily equivalent ketones comprise cyclic ketones including cyclohexanone, benzophenone, alkyl aryl ketones, alkyl cyclohexyl ketones, aryl aryl ketones, aryl cyclohexyl ketones, including compounds as acetophenone, ethyl phenyl ketone, propyl phenyl ketone, butyl phenyl ketone, amyl phenyl ketone, methyl cyclohexyl ketone, ethyl cyclohexyl ketone, propyl cyclohexyl ketone, butyl cyclohexyl ketone. It is understood that mixtures of ketones may be utilized when desired.

The aldehydes are employed when it is desired to produce N,N'-di-alkyl, N,N,N',N'-tetra-alkyl or a mixture of substituted phenylenediamines. Suitable aldehydes include formaldehyde, acetaldehyde, propionaldehyde, butyraldehyde, valeraldehyde. It is understood that the particular aldehyde to be employed will depend upon the particular product desired. Similarly, it is understood that mixtures of aldehydes may be utilized when desired.

The present invention is particularly applicable to the reductive alkylation of p-nitroaniline, p-phenylenediamine, p-nitrophenol or p-aminophenol with a ketone to produce an N,N'-di-sec-alkyl-p-phenylenediamine or an N-sec-alkyl-p-aminophenol, both of which, as hereinbefore set forth, are particularly desirable for use as oxidation inhibitors in unstable organic compounds and still more particularly in cracked gasoline. In the interest of simplicity, the following description will be directed to the reductive alkylation of p-nitroaniline and methyl ethyl ketone, with the understanding that the process is applicable to the reduction of other compounds containing these substituents and aldehydes or other ketones, with suitable modifications in operating conditions, when necessary, and with the understanding that the products are not necessarily equivalent.

The reductive alkylation of p-nitroaniline and/or p-phenylenediamine with ketones and/or aldehydes is readily effected at a temperature of from about 50° to about 500° F. and a pressure of from about 100 to 3000 pounds or more per square inch. Hydrogen is utilized in an amount of at least one mole of hydrogen per mol of p-nitroaniline and/or p-phenylenediamine. When p-nitroaniline is utilized and it is desired to obtain complete reductive alkylation, at least five mols of hydrogen per mol of p-nitroaniline is necessary. Similarly, with p-phenylenediamine, at least two mols of hydrogen per mol of p-phenylenediamine is necessary. In general, it is preferred to operate with a slight molar excess of hydrogen over that required stoichiometrically.

As hereinbefore set forth, improved results are obtained when using a sulfided platinum catalyst. As will be shown in the following examples, the use of the sulfided platinum catalyst produced unexpectedly higher yields of the desired N,N-di-sec-alkyl-p-phenylenediamine. Also, as will be shown by the data in the accompanying examples, the novel catalyst of the present invention produced considerably lower amounts of undesired products, such as monoalkylated products when used with p-nitroaniline or p-phenylenediamine. In addition, the novel catalyst of the present invention effects considerably less reduction of the ketone to the alcohol. This is important because it avoids a difficult separation problem and avoids the loss of ketone for further use in the process. It is apparent that these improved results are of considerable importance from a commercial viewpoint in the production of the desired reductive alkylation products.

The sulfided platinum catalyst of the present invention is prepared in any suitable manner. In a preferred embodiment the platinum is composited with a suitable carrier or supporting component. Any suitable carrier or supporting component may be utilized. A particularly preferred support comprises alumina, which may be naturally occurring or synthetically prepared. The synthetically prepared alumina is readily manufactured by the reaction of a suitable basic compound such as ammonium hydroxide, ammonium carbonate, sodium hydroxide, sodium carbonate, potassium hydroxide, with an aluminum salt such as aluminum chloride, aluminum sulfate, aluminum nitrate, aluminum acetate. The resultant aluminum hydroxide preferably is washed to remove soluble impurities and then may be composited with the platinum or may first be dried at a temperature of from about 200° to about 500° F. or more for a period of from about 2 to 24 hours or more and calcined at a temperature of from about 800° to 1400° F. or more, and then composited with the platinum. Other suitable but not necessarily equivalent supporting components include silica, asbestos, charcoal, zinc oxide, magnesium oxide, molybdenum oxide, thorium oxide, zirconium oxide, silica-alumina, silica-zirconia, silica-magnesia, silica-thoria, silica-alumina-zirconia, silica-alumina-magnesia, silica-alumina-thoria, silica-zirconia-thoria, zirconia-magnesia-thoria. The supporting component preferably is difficultly reducible in order to avoid conversion of the supporting component during the reductive alkylation reaction and in a preferred embodiment the support comprises a difficultly reducible metal oxide. The carrier preferably is formed into particles of uniform or irregular size and shape in any suitable manner including grinding, extrusion, pelleting, spray drying, oil drop method, prior to compositing with the platinum.

The platinum may be composited with the support in any suitable manner. Preferably the platinum is utilized in the form of a water soluble compound. A particularly preferred source of platinum is chloroplatinic acid because of its ready availability and lower cost. Other suitable but not necessarily equivalent platinum compounds include ammonium platinum chloride, trimethylbenzyl ammonium platinum chloride, tetramino-platino chloride, ammonium-platinonitrite. In a preferred method of manufacture, the support is first formed into particles of uniform or irregular size and shape, a solution of the platinum compound is commingled with the preformed support particles, and then the mixture is evaporated to dryness. In another method, the platinum may be composited with the support and then formed into particles of uniform or irregular size and shape.

The concentration of platinum in the supported catalyst may range from 0.01% to 25% or more and preferably from about 0.2% to about 5% by weight of the finished catalyst. When desired, the catalyst may contain acidic components such as combined halogen and particularly fluorine and/or chlorine. The concentration of the halogen generally will be within the range of from about 0.1% to about 8% by weight of the final catalyst. When both fluorine and chlorine are present in the catalyst, the total halogen content will be within the range hereinbefore set forth. In one method, the platinum is first composited with the preformed particles of the support and then, either before or after drying thereof, the halogen is added, preferably as an aqueous solution thereof.

In accordance with the present invention, the catalyst prepared in the manner hereinbefore set forth, is subjected to a sulfiding treatment. In a preferred embodiment, the catalyst is subjected to reduction with hydrogen prior to sulfidation. The reduction may be effected at a temperature of from about 100° to about 1500° F. and at a pressure of from atmospheric to 5000 pounds per square inch or more. The sulfiding treatment is effected in any suitable manner. In a preferred method, hydrogen sulfide gas, alone or preferably in a mixture with hydrogen or other suitable gaseous or liquid diluent, is contacted with the previously prepared composite. Although this may be effected at atmospheric temperature, generally it is preferred to effect this treatment at an elevated temperature which may range from 100° to 1500° F. and preferably from about 400° to about 1200° F. Atmospheric pressure or superatmospheric pressure, which may range up to 5000 pounds or more per square inch, may be employed. The time of sulfiding will range from one-half hour or less to twelve hours or more. Generally, the sulfidation will be continued until absorption of hydrogen sulfide no longer occurs.. However, in another embodiment of the invention, complete sulfidation is not required but the sulfidation is continued for a sufficient time to effect substantial sulfidation of the catalyst, which generally will range from about 0.05 to about 5 mole percent sulfur in the final catalyst.

In another embodiment of the invention, sulfidation of the catalyst is effected using other sulfur-containing reactants including, for example, aliphatic mercaptans such as methyl mercaptan, ethyl mercaptan, propyl mercaptan, butyl mercaptan, aromatic mercaptans such as thiophenol, thiocresol, carbon disulfide, sulfur vapors, sulfur dissolved in a suitable solvent such as aromatic hydrocarbons including benzene, toluene, ethyl benzene. It is understood that any suitable method of preparing the sulfided platinum catalyst is employed in accordance with the present invention.

The reductive alkylation reaction may be effected in either batch or continuous operations. The present invention is particularly adapted for use in a continuous process because of the long catalyst life which, in turn, permits long runs without interruptions for catalyst replacement. Also, as hereinbefore set forth, the process does not produce undesirable side reaction products and, therefore, will not require excessive fractionation or other separating means to recover the desired products. These advantages also are applicable to a batch type process.

As hereinbefore set forth, the temperature for the reductive alkylation is within the range of from about 50° to about 500° F. In general, it is preferred to utilize as low a temperature as satisfactory because the reaction is exothermic and will increase the temperature. Therefore, it is preferred to provide means for cooling the reaction mixture and this may be accomplished in any suitable manner which will depend upon the particular plant apparatus employed. In one method the reaction chamber may be surrounded by a suitable liquid which will vaporize at the desired temperature and will absorb the exothermic heat of reaction due to the latent heat of vaporization. Other methods are well-known in the art and may be employed.

As hereinbefore set forth, the present invention is particularly advantageous with continuous type processes. In the continuous type process the catalyst is deposited in a reaction zone and the reactants, at the proper temperature and pressure, are passed into the reaction zone in either upward or downward flow. The effluent products from the reaction zone are subjected to fractionation or other suitable means to separate the desired products from hydrogen and unreacted ketone, the latter two preferably being recycled for further use in the process. Another type of continuous process comprises the slurry or suspensoid type in which the catalyst is carried into the reaction zone by means of one or more of the reactants. In a batch type operation the catalyst preferably is first placed in a suitable reaction zone and the reactants, at a suitable temperature and pressure are introduced into the reaction zone and kept therein for the desired time. The products then are withdrawn from the reaction zone and separated by suitable means.

While the present invention is particularly applicable to the reductive alkylation of p-nitroaniline, p-phenylenediamine, p-nitrophenol and p-aminophenol, as hereinbefore set forth other organic compounds containing these substituents may be reacted in accordance with the present invention but not necessarily with equivalent results. Typical examples of other organic compounds include mono- and poly-nitrocyclohexanes and/or aminocyclohexanes, similarly substituted 5 membered cycloalkyl compounds, similarly substituted pyridine compounds, pyrrole compounds, pyrrolidine compounds, pyrazole compounds, furan compounds, thiophene compounds.

The following examples are introduced to illustrate further the novelty and utility of the present invention but not with the intention of unduly limiting the same.

EXAMPLE I

This example illustrates the beneficial effects obtained when using a sulfided catalyst of the present invention as compared with a similarly prepared catalyst which has not been subjected to sulfidation. Alumina-platinum-halogen catalysts were prepared in substantially the following manner. Alumina-halogen spheres of about one-sixteenth inch diameter were prepared to contain a mixture of fluorine and chlorine in a total concentration of below about 2% by weight of the composite. The spheres were dried at about 1200° F. and then were soaked with an aqueous chloroplatinic acid solution to prepare a catalyst containing less than 1% by weight of platinum. The catalyst composite then was dried and calcined in air at a temperature of about 1200° F.

A catalyst prepared in the above manner is identified herein as catalyst A, and is representative of the catalysts theretofore proposed for use in reductive alkylation. Analysis of this catalyst showed a nil sulfur content of 0.005% by weight.

Catalyst B, as illustrative of the improved catalyst of the present invention, was prepared as follows. 350 cc. of an alumina-platinum-halogen composite, prepared in substantially the same manner as described above, were heated at atmospheric pressure to a temperature of about 1000° F. in an atmosphere of hydrogen, the hydrogen being supplied at a rate of 3600 cc. per minute. The catalyst was held at this temperature for about one-half hour. Then 40 cc. per minute of hydrogen sulfide were added to the hydrogen stream and the mixture then passed over the catalyst at the same temperature for about one-half hour. Analysis of the catalyst showed a sulfur content of 0.16% by weight.

Each of the catalysts was evaluated in a series of reductive alkylation runs conducted as follows: 100 cc. of the catalyst were placed in a jacketed reaction tube. Hydrogen and a solution of about 8% by weight p-nitroaniline in ethyl amyl ketone were passed downwardly through the catalyst at a flow rate of 100 cc. per hour and a pressure of 850 pounds per square inch. A series of tests at different temperatures were made with each of the catalysts as follows. The plant was brought up to operating temperature and then a test period was run at this temperature. The product was collected for the test period and subjected to analysis. The plant temperature then was increased to the next higher temperature and another test period was run and the product collected. This procedure was repeated to cover the desired temperature range.

The reductive alkylation of p-nitroaniline with ethyl amyl ketone is employed to prepare N,N'-di-octyl-p-phenylenediamine. Undesired side reactions include (1) alcohol formed by hydrogenation of the ketone, (2) monoalkylated compound (N-octyl-p-phenylenediamine), (3) other intermediate side reaction products which comprise octyl amine and dioctyl amine formed by the splitting off of the nitrogen atom from the benzene ring and reaction with the ketone, and (4) material boiling higher than the desire N,N'-di-octyl-p-phenylenediamine.

The products from each of the test periods were collected and analyzed by GLC (Gas Liquid Chromatography) to determine the amounts of the different fractions set forth above. These fractions were determined on the basis of the area percent thereof.

The following table reports the results of comparable runs made at a jacket temperature of about 267° F. The alcohol formed by the hydrogenation of ketone is reported as the percent of alcohol in the ketone-alcohol fraction and is determined by the area percent recordings in the GLC analyses. The monalkylated compound is reported as a ratio thereof to the amount of the desired N,N'-di-octyl-p-phenylenediamine produced in the test period. The amount of other intermediate side reaction products also is reported as the ratio thereof to the amount of the N,N'-di-octyl-p-phenylenediamine produced. The amount of material boiling higher than the desired N,N'-di-octyl-p-phenylenediamine also is reported on the same basis. As hereinbefore set forth, these ratios are based upon the area percent analysis determined in the GLC analyses.

*Table I*

| Fraction | Catalyst A | Catalyst B |
|---|---|---|
| Percent of N,N'-di-octyl-p-phenylenediamine | 10.0 | 15.8 |
| Percent of ethyl amyl alcohol (octanol) in the ketone alcohol fraction | 16.5 | 3.6 |
| Ratio of mono-N-octyl-p-phenylenediamine to N,N'-di-octyl-p-phenylenediamine | 0.13:1 | 0.038:1 |
| Ratio of other intermediate reaction products to N,N'-di-octyl-p-phenylenediamine | 0.4:1 | 0.025:1 |
| Ratio of higher boiling material to N,N'-di-octyl-p-phenylenediamine | 0.03:1 | 0.013:1 |
| Jacket temperature, °F | 266 | 267 |
| Maximum catalyst temperature, °F | 306 | 304 |

The theoretical weight percent of N,N'-di-octyl-p-phenylenediamine in the GLC analyses is 19.9%. It will be noted that catalyst B (sulfided catalyst) produced 15.8% of N,N'-di-octyl-p-phenylenediamine, which is over one and one-half times the amount produced with catalyst A. Also, the amount of alcohol formed with catalyst B is approximately one-fourth of that formed with catalyst A. It will be noted that the other intermediate products formed with catalyst A amounted to about 40% of the N,N'-di-octyl-p-phenylenediamine, whereas these other intermediate products were only about 2.5% when using catalyst B.

The above data demonstrate the important improvements of the sulfided catalyst of the present invention as compared to the heretofore proposed catalyst.

EXAMPLE II

Another series of runs were made in the same manner described in Example I except that the jacket temperature used in the reductive alkylation was about 285° F. The results of these runs are reported in the following table.

*Table II*

| Fraction | Catalyst A | Catalyst B |
|---|---|---|
| Percent of N,N'-di-octyl-p-phenylenediamine | 8.2 | 18.7 |
| Percent of ethyl amyl alcohol (octanol) in the ketone alcohol fraction | 34.9 | 7.8 |
| Ratio of mono-N-octyl-p-phenylenediamine to N,N'-di-octyl-p-phenylenediamine | 0.085:1 | 0.021:1 |
| Ratio of other intermediate reaction products to N,N'-di-octyl-p-phenylenediamine | 0.927:1 | 0.043:1 |
| Ratio of higher boiling material to N,N'-di-octyl-p-phenylenediamine | 0.024:1 | 0.021:1 |
| Jacket temperature, ° F | 284 | 286 |
| Maximum catalyst temperature, ° F | 325 | 341 |

Here again, it will be noted that the amount of N,N'-di-octyl-p-phenylenediamine was considerably higher when using catalyst B and almost double the amount produced when using catalyst A. Also, the amount of ketone hydrogenated to alcohol was almost 35% when using catalyst A, whereas it was only about 8% when using catalyst B. Of particular interest is the fact that the amount of other intermediate products was 92% when using catalyst A and only 4% when using catalyst B. As hereinbefore set forth, this is an important improvement in the operation of the process.

EXAMPLE III

Another series of runs were made in the same manner as described in Example I except that the reductive alkylation was effected at a jacket temperature of about 302° F. The results of these runs are reported in the following table.

*Table III*

| Fraction | Catalyst A | Catalyst B |
|---|---|---|
| Percent of N,N'-di-octyl-p-phenylenediamine | 6.3 | 16.6 |
| Percent of ethyl amyl alcohol (octanol) in the ketone alcohol fraction | 58.4 | 9.4 |
| Ratio of mono-N-octyl-p-phenylenediamine to N,N'-di-octyl-p-phenylenediamine | 0.079:1 | trace |
| Ratio of other intermediate reaction products to N,N'-di-octyl-p-phenylenediamine | 1.984:1 | 0.060:1 |
| Ratio of higher boiling material to N,N'-di-octyl-p-phenylenediamine | 0.032:1 | 0.030:1 |
| Jacket temperature, ° F | 302 | 302 |
| Maximum catalyst temperature, ° F | 349 | 349 |

Here again, the considerable improvement obtained when using the catalyst of the present invention is demonstrated. The amount of N,N'-di-octyl-p-phenylenediamine is over two and one-half times that obtained when using catalyst A. The amount of ketone hydrogenated to alcohol was only 9.4% with catalyst B as compared to 58.4% with catalyst A. Of particular interest is the amount of other intermediate products formed. With catalyst B this is only about 6%, whereas with catalyst A this amounted to almost double the amount of N,N'-di-octyl-p-phenylenediamine produced.

EXAMPLE IV

Another series of runs were made in the same manner as described in Example I except that the reductive alkylation was effected at a jacket temperature of about 320° F. Substantially the same differences in results were obtained at this temperature as were obtained in Examples I to III. The percent of N,N'-di-octyl-p-phenylenediamine was 15.0 with catalyst B and only 2.9 with catalyst A. The percent alcohol and monoalkylated products were considerably lower with catalyst B than with catalyst A. Of particular interest is the formation of other intermediate products which, with catalyst B, was only 28% of the N,N'-di-octyl-p-phenylenediamine, but was over five times the amount of N,N'-di-octyl-p-phenylenediamine when using catalyst A.

EXAMPLE V

The same general results were obtained when using catalyst A and catalyst B for reductive alkylation at a jacket temperature of about 338° F. The percent of N,N'-di-octyl-p-phenylenediamine was 11.9 when using catalyst B and only 1.4 when using catalyst A. The intermediate products formed with catalyst B were 58% of the N,N'-di-octyl-p-phenylenediamine, but were over 13 times (1357.1%) of the N,N'-di-octyl-p-phenylenediamine produced with catalyst A. Because the amount of N,N'-di-octyl-p-phenylenediamine produced with catalyst A was very low (only 1.4%), the amount of other intermediate products appear so high when expressed on a percent or ratio basis. However, this is a true comparison and accurately evaluates the formation of the desired and undesired products.

EXAMPLE VI

N,N'-di-sec-butyl-p-phenylenediamine is prepared by the reductive alkylation of p-nitroaniline with methyl ethyl ketone at 300° F. and 1200 pounds per square inch hydrogen pressure utilizing a mole ratio of methyl ethyl ketone to p-nitroaniline of 10:1. The catalyst is prepared in the same manner as described in Example I and is subjected to sulfidation by treatment with hydrogen sulfide admixed with hydrogen at 900° F. Sulfidation of the catalyst results in increased amounts of N,N'-di-sec-butyl-p-phenylenediamine and reduced formation of alcohol, monoalkylated products, other intermediate side reaction products and products boiling above N,N'-di-sec-butyl-p-phenylenediamine.

EXAMPLE VII

N-octyl-p-aminophenol is prepared by the reductive alkylation of p-nitrophenol with methyl hexyl ketone in the presence of a catalyst comprising 1.5% by weight of platinum composited with char and sulfided with tertiary butyl mercaptan. The catalyst is prepared by forming uniform particles of the char in a pilling operation, soaking the resultant pills in an aqueous solution of chloroplatinic acid, followed by drying and then sulfiding with tertiary mercaptan at 500° F. for one hour. The reductive alkylation is effected at 300° F. and a hydrogen pressure of 1200 pounds. Here again, increased yield of the desired reductive alkylation product is obtained, along with reduced formation of alcohol and other side reaction products.

EXAMPLE VIII

N-isopropyl-ethanolamine is prepared by the reductive alkylation of ethanolamine with acetone at 250° F. and a hydrogen pressure of 750 pounds per square inch in the presence of the catalyst as prepared in Example I. Sulfidation of the catalyst serves to increase the yields of N-isopropyl-ethanolamine and to reduce undesired hydrogenation of acetone to isopropyl alcohol and the formation of other side reaction products.

EXAMPLE IX

Bis-nonylamine is prepared by the reductive alkylation of ammonia with diisobutyl ketone at 365° F. and a hydrogen pressure of 900 pounds per square inch in the presence of a sulfided platinum-containing catalyst prepared in the manner described in Example I. Sulfidation of the catalyst serves to increase the yields of the desired dinonylamine and to reduce the yields of undesired side reaction products.

I claim as my invention:

1. A process for the reductive alkylation of a compound selected from the group consisting of p-nitroaniline, p-phenylenediamine, p-nitrophenol and p-aminophenol with an alkyl ketone having from 3 to 11 carbon atoms, which consists of effecting said reductive alkylation at a temperature of from about 50° to about 500° F. and a pressure of from about 100 to about 3000 pounds per square inch with at least one mole of hydrogen per mole of said compound in the presence of a sulfided catalyst consisting essentially of alumina and from about 0.2 to about 5% by weight of platinum, said catalyst containing from about 0.05 to about 5 mole percent of sulfur.

2. The process of claim 1 wherein said compound is p-nitroaniline.

3. The process of claim 1 wherein said compound is p-phenylenediamine.

4. The process of claim 1 wherein said compound is p-aminophenol.

5. The process of claim 1 wherein said ketone is methyl ethyl ketone.

6. The process of claim 1 wherein said ketone is ethyl amyl ketone.

7. The process of claim 1 wherein said ketone is methyl hexyl ketone.

References Cited by the Examiner

UNITED STATES PATENTS

| | | | |
|---|---|---|---|
| 2,533,723 | 12/50 | Dombrow | 260—577 X |
| 2,828,343 | 3/58 | Tindall | 260—577 X |
| 2,914,485 | 11/59 | Keith | 252—439 X |
| 2,969,394 | 1/61 | Chenicek | 260—577 |

CHARLES B. PARKER, *Primary Examiner.*